Aug. 7, 1945.   J. A. SIDERMAN   2,381,009
CHRONOMETRIC RADIOSONDE SYSTEM
Filed Aug. 26, 1944   2 Sheets-Sheet 1
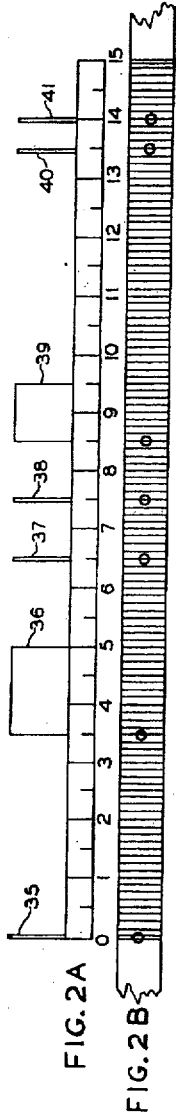
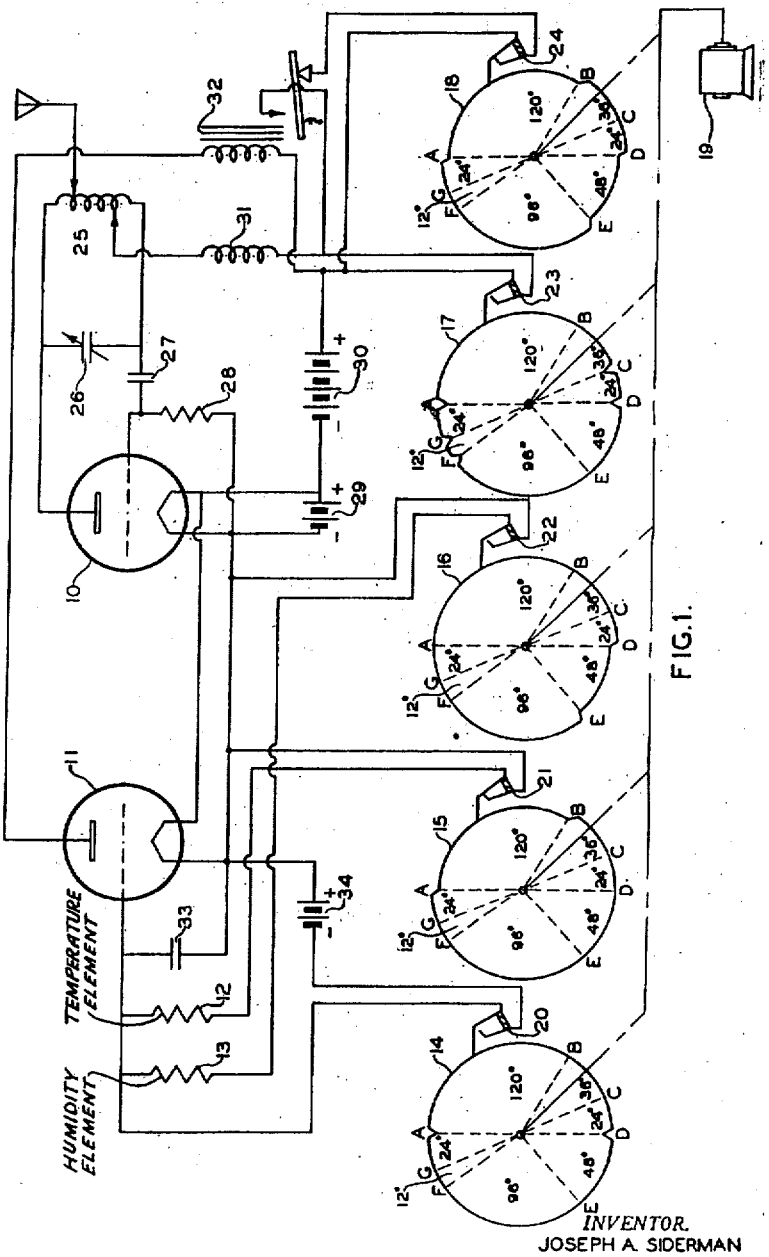
INVENTOR.
JOSEPH A. SIDERMAN
BY William D. Hall
ATTORNEY

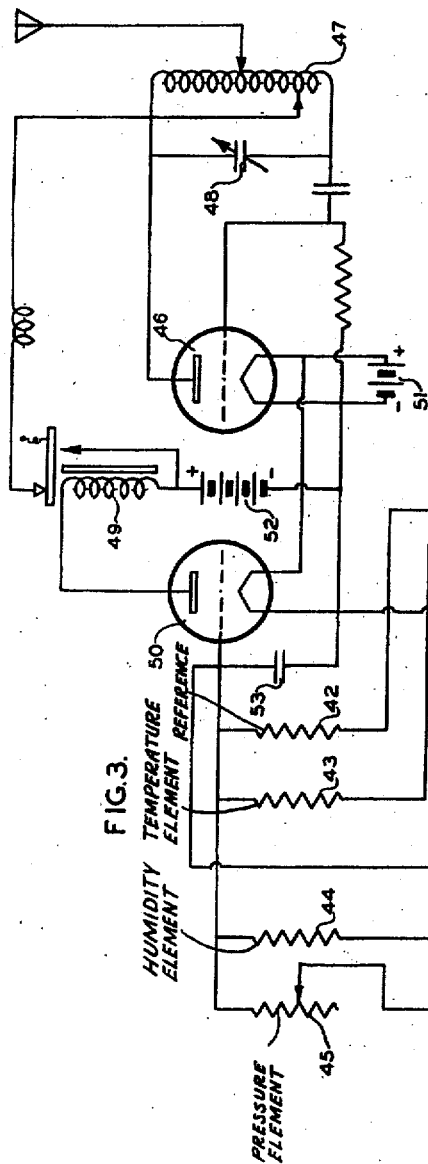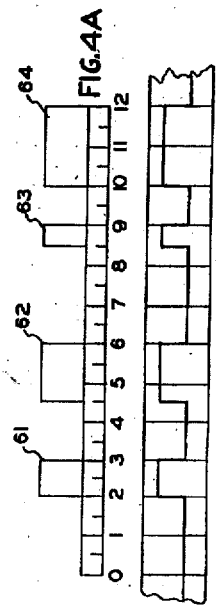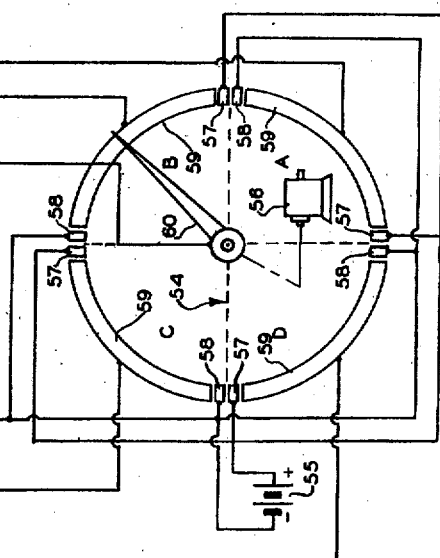

Patented Aug. 7, 1945

2,381,009

UNITED STATES PATENT OFFICE 2,381,009

CHRONOMETRIC RADIOSONDE SYSTEM

Joseph A. Siderman, Eatontown, N. J.

Application August 26, 1944, Serial No. 551,419

3 Claims. (Cl. 177—359)

(Granted under the act of March 3, 1883, as amended April 30, 1928; 370 O. G. 757)

The invention described herein may be manufactured and used by or for the Government for governmental purposes, without the payment to me of any royalty thereon.

The present invention pertains broadly to radiosonde apparatus for the measurement of meteorological conditions through various levels of the atmosphere and radio transmission of the measurements for recording at a receiving station. More particularly the invention relates to such apparatus of the chronometric type intended to be carried by a balloon for the determination of the pressure, temperature, and humidity values or conditions of the atmosphere, and for the radio transmission of the same to a ground station equipped with receiving and recording apparatus.

Known radiosonde systems can be roughly divided into two major categories, namely, those which transmit a radio or audio frequency that is variable with the position of the meteorological elements, and those transmitting radio signals spaced in time, the values of the meteorological elements being deduced from the intervals between signals.

In the first mentioned class, that is, apparatus transmitting variable frequencies, one form thereof introduces resistance into the circuit of an audio frequency generator which modulates the radio transmitter, the value of resistance introduced being controlled by the position or condition of barometric, humidity, and temperature elements. In another form of apparatus of this general type, the sensitive elements govern the position of a variable tuning condenser in an oscillatory circuit, and the resultant variations in radio frequency from a predetermined reference value provide the index to the measurements.

In the second mentioned class, that is, of the time interval or chronometric type, one form of apparatus employs a multi-contact rotary switch performing as a key in a radio frequency transmitter circuit, said rotary switch comprising an arm carrying an electrical contact rotated by means of a motor at a uniform speed, in cooperation with three adjustable contacts spaced at various points in the circular path of the rotating contact and so arranged that the rotating contact touches each of them for a moment once in each revolution. Each adjustable contact is mechanically linked to respective barometric, temperature, and humidity elements in a manner whereby the position of the contact is shifted in accordance with the meteorological condition measured. Thus, in the course of a complete switching revolution, the transmitter is keyed at intervals determined by the position of the adjustable contacts and with successive revolutions of the switch, new points of contact are made corresponding to meteorological changes.

Meteorological instruments employed in conjunction with radiosonde apparatus have, in most cases, been of conventional design adapted to function cooperatively with the electrical circuit. For example, where an aneroid cell is utilized for measuring atmospheric pressure in a variable frequency radiosonde system, mechanical linkage from the aneroid bellows to the slider arm of a variable resistor is provided, thereby converting the cell movements into corresponding variations of resistance, which in turn effect frequency variations in the radiosonde circuit. When applied to a chronometric radiosonde system, the aneroid bellows, by means of mechanical coupling, serve to displace the position of an adjustable contact in the rotary switch keying the transmitter, thereby making the interval of signal transmission a function of atmospheric pressure. In a like manner, a bi-metallic temperature element is incorporated in a radiosonde circuit by mechanically linking the element either to the slider arm of a variable resistor or an adjustable rotary switch contact. The hair hygrometer is adapted for radiosonde humidity measurement purposes by connecting it through levers to either the slider arm of a variable resistor or the adjustable contact of a rotary switch depending upon which system is used.

In recent years, elements have been developed which directly convert the atmospheric measurements into corresponding resistance changes without requiring intermediate mechanical linkages. Ceramic resistors, for example, have been devised whose resistance value is a function of ambient temperature. These resistance elements have, in many instances, successfully supplanted bi-metallic elements previously in use because of their accuracy, comparative simplicity, and freedom from mechanical difficulties.

The large time lag of hair hygrometers in response to humidity changes introduces serious errors since sudden humidity changes are often encountered by a rapidly ascending balloon. This lag increases with decreasing temperature so that the accuracy of this type of hygrometer becomes progressively worse with increasing altitudes. These disadvantages are obviated by the electrical hygrometer which directly interprets relative humidity in terms of resistance by the use of palladium wires coated by a suitable layer of lithium chloride.

The installation of these atmospherically sensitive resistors in radiosonde systems of the variable frequency type is easily accomplished inasmuch as they may be directly associated with the radio frequency or modulation circuit to effect a frequency change. It has not, however, heretofore been possible to install such resistors in chronometric radiosonde systems since a change of resistance in response to a change in an atmospheric condition cannot, with systems heretofore in use, be made to directly shift the position of an electrical contact in a keying circuit thereby determining the interval of transmission.

Accordingly, it is the principal object of the present invention to provide means whereby a meteorological instrument of the resistance element type may be employed in conjunction with chronometric radiosonde apparatus.

It is another object of this invention to provide switching means adapted to successively connect each of a plurality of resistance elements into a chronometric radiosonde circuit.

A major difficulty heretofore experienced in chronometric radiosonde systems is the inaccuracy resulting from variations in the speed of the motor operating the telemetric circuit-controlling device. Due to the great range of temperature encountered, these mechanisms, whether of the spring actuated or electric type, vary in speed because of the effects of metallic expansion and contraction. Moreover, by reason of the fact that the viscosity of motor lubricants changes with temperature, these speed variations are accentuated.

Accordingly, it is a further object of the present invention to provide means whereby the accuracy of a chronometric radiosonde system is maintained despite variations in motor speed.

The use of variable frequency radiosonde apparatus usually entails extensive ground equipment which can be operated and maintained only by highly skilled personnel. In order to record the variations in frequency obtained in the output of the ground station receiver, a frequency meter is required, including a frequency standard which yields an output energy proportionate to the received frequency, said energy serving to actuate the recording device. Because of the size and weight of this equipment, its use as a mobile or portable unit is not always feasible.

Where a chronometric radiosonde system is employed, the ground equipment may, in its simplest form, consist of a receiver for intercepting the radiosonde signals and a manually operated stop watch for measuring the time intervals. For automatic recording purposes an electronic timer may be coupled to the output of the receiver, or if preferred, a printing tape recorder. In any case, regardless of which interval recorder is used, the ground equipment is considerably less involved than with variable frequency systems, hence far better adapted for mobile or portable applications.

Broadly stated, the objects of the present invention are attained by providing a radiosonde transmitter incorporating an electronic keying circuit. Meteorological resistance elements are associated with the electronic keying circuit in a manner whereby the ohmic value of each element determines consecutively the operating periods of the keying circuit. This is accomplished by successively shunting each element across a charged condenser which proceeds to discharge therein at a rate in accordance with the time constant of the R-C combination. The R-C network is so connected in the control circuit of the electronic key whereby the key is actuated for a period commencing with maximum condenser charge and ending when the condenser charge is dissipated to a predetermined level. Motor operated mechanical switching means are provided for periodically charging the condenser and sequentially shunting each of a plurality of resistance elements thereacross.

In order to obviate inaccuracies arising from variations in the switching motor speed or fluctuations in the voltages applied to the electrical components of the radiosonde apparatus, a reference resistor is provided which is insensitive to atmospheric conditions. By shunting the reference resistor across the charged condenser once in each switching cycle, a signal is transmitted whose duration determines the scale of the reading.

For a better understanding of the invention, together with other features and further objects thereof, reference is had to the following detailed description taken in connection with the accompanying drawings.

The scope of the invention will be pointed out in the accompanying claims.

In the accompanying drawings:

Figure 1 is a schematic circuit diagram of a preferred embodiment of a chronometric radiosonde system, Figure 2A is a time scale showing the sequence and duration of signals transmitted by apparatus illustrated in Figure 1 in the course of a switching cycle, while Figure 2B shows a time interval tape record derived from the signals depicted in Figure 2A, Figure 3 is a schematic circuit diagram of another preferred embodiment of a chronometric system, and, Figure 4A is a time scale showing the sequence and duration of signals transmitted in the course of a switching cycle by apparatus illustrated in Figure 3, while Figure 4B shows a time interval record derived from signals depicted in Figure 4A.

Referring now to Figure 1, a preferred embodiment of a chronometric radiosonde device is shown comprising a radio frequency transmitter including a triode vacuum tube 10, and an electronic switching circuit including a triode vacuum tube 11. The radiosonde device shown herein is arranged to transmit temperature and humidity measurements, and for this purpose, there is provided a temperature-responsive ceramic resistor 12 and an electrical hygrometer designated by resistor 13. While for simplicity of explanation only two elements are included in the circuit shown in Figure 1, additional elements may be readily incorporated therein.

Mechanical switching operations are performed by a set of five cams, 14, 15, 16, 17 and 18 fixedly mounted on a single shaft rotated by a motor 19 of either mechanical or electrical construction. Mechanically associated with each of cams 14 to 18 by means of cam followers are switches 20, 21, 22, 23 and 24 respectively, having cooperative spring contact fingers, which are designed to close when the follower rides into an indented portion of the cam.

The transmitter is of a conventional design having a resonant tuning circuit formed by an inductor 25 in parallel with a variable capacitor 25, the combination being connected between plate and grid of triode 10 in series with a fixed capacitor 27. A grid leak 28 is connected between grid and filament of triode 10. Filament voltage for both triodes 19 and 11 is provided by "A" battery 29, and plate voltage is provided by "B" battery 20. The positive terminal of battery 30 is connected serially with switch 23 and a radio frequency choke 31 to a tap on inductor 25. It will be seen that when switch 23 is closed, voltage is applied to the plate of triode 10 causing a signal to be emitted by the radiosonde transmitter.

The positive terminal of battery 30 is also connected to the plate of triode through the coil of an electromagnetic relay 32. The armature contacts of relay 32 are connected in series with switch 24 across the terminals of switch 23. Thus in order for relay 32 to key the transmitter, switch 24 must be closed. The intensity of current flow through the plate circuit of triode 11, in the absence of bias on the grid thereof, is sufficient to energize relay 32 thereby closing its armature contacts. The contacts of relay 32 will remain closed until a bias is applied to the grid of triode 11 of a magnitude limiting current flow therein to a level insufficient to energize the relay.

Connected between filament and grid of triode 11 is a capacitor 33. A "C" battery 34 is provided connected between filament and grid of triode 11 through switch 20. One end of temperature element 12 is connected to the grid of triode 11, the other end being connected to filament through switch 21. One end of humidity element 13 is connected to the grid of triode 11, the other end being connected to filament through switch 22.

To facilitate explanation in correlating the operation of cams 14 to 18, letters A to G have been assigned to various points on the periphery of each cam, identical letters designating identically disposed points. It will be assumed that cams 14 to 18 revolve in a counterclockwise direction with the speed of one revolution per 15-seconds, the angular velocity, therefore, being 24° per second.

The effect of a complete cam switching cycle upon radio transmission will be best understood by referring to Figure 2A illustrating, along a time scale graduated from 0 to 15 seconds, the interval and duration of each signal transmission. Starting from point A at zero time setting, a sharp indent formed on cam 14 closes switch 20 and a sharp indent on cam 17 closes switch 23. The operation of switch 23 applies a plate voltage to triode 10 causing a reference signal to be transmitted as shown by pulse 35 in Figure 2A. The closing of switch 20 connects battery 34 across condenser 33 immediately charging same. The charge on condenser 33 imposes a negative bias on the grid of triode 11 of a magnitude rendering said tube nonconductive and releasing the armature of relay 32 in the plate circuit thereof.

Continuing in counterclockwise motion for five seconds between points A and B, on cams 15 and 18 extended indents are formed causing switches 21 and 24 to operate during the entire 120° of cam travel between these points. The operation of switch 21 shunts temperature element 12 across condenser 33 and the operation of switch 24 connects the armature contacts of relay 32 across the terminals of switch 23. At point A, the armature contacts of relay 32 are open because of the cutoff bias imposed on the grid of triode 11, but as condenser 33 proceeds to discharge through element 12 in the interval of travel between points A and B, the bias on triode 11 is diminished to a level where relay 32 is again energized, thereby applying plate voltage to triode 10 through switch 24 and causing a signal to be emitted. Since point B is spaced 120° from point A, the transmission of the temperature signal can occur within a five second interval at a particular instant determined by the ohmic value of temperature element 12. For purposes of illustration, it will be assumed that relay 32 is energized 3.5 seconds, or 84°, from point A as shown by pulse 36 in Figure 2A and inasmuch as the armature contacts of relay 32 remain connected in the plate circuit of triode 10 for five seconds, the transmitter remains operative for 1.5 seconds thereafter.

As the cams travel 36° in a second and one-half from point B to C, at point C only switch 23 is operated by a sharp indent formed on cam 17 causing a reference signal 37 to be transmitted as shown in Figure 2B. Continuing 24° in one second from point C to D, at point D a sharp indent formed in cam 17 operates switch 23 causing a reference signal 38 to be transmitted and an indent formed on cam 17 operates switch 20 thereby recharging condenser 33.

The bias applied by condenser 33 to the grid of triode 11 renders the tube nonconductive causing relay 32 to release its armature contacts. Moving for 2 seconds from point D to point E spaced 48° therefrom, extended indents are formed on cams 16 and 18 between these points causing switches 22 and 24 to operate. Switch 22 shunts humidity element 13 across condenser 33 while switch 24 connects the armature contacts of relay 32 across the terminals of switch 23. The charge on condenser 33 is dissipated by humidity element 13 to a level permitting relay 32 to operate, thereby applying plate voltage to triode 10 resulting in signal transmission. Since the distance between points D and E is 48°, or two seconds, the humidity transmission can occur between 7.5 and 9.5 seconds of the switching cycle, and for purposes of illustration herein it will be assumed that the transmission is of one second duration as shown by pulse 39 in Figure 2A.

Continuing 96° in 4 seconds from point E to F, none of switches 20 to 24 is operated until a sharp indent formed on cam 17 at point F operates switch 23 causing a reference pulse 40 to be transmitted as shown in Figure 2A. Moving 12° in a half-second from point F to point G a sharp indent formed on cam 17 again operates switch 23 causing another reference pulse 41 to be transmitted as shown in Figure 2A. And finally, continuing 24° from point G back to point A in one second the switching cycle is completed with none of the switches operated between these points.

It is, of course, obvious that for a given speed of motor 19, the indent length between points A and B on cams 15 and 18 must be adequate to permit temperature element 12 to discharge condenser 33 to a level operating the transmitter at any ohmic value within the working range of the element. Likewise, the same condition holds true for humidity element 13 with respect to the indents on cams 16 and 18 between points D and E. If it is desired to include a barometric slide wire resistance element in the circuit, the unused portion of cams 14 to 18 lying between points E and point F may be indented for this function.

It is to be noted in examining Figure 2A that reference pulse 35 indicates the beginning of the switching cycle, reference pulse 36 marks the midpoint of the switching cycle, and closely spaced reference pulses 40 and 41 denote the conclusion of the cycle. These radiosonde signals may be received and recorded by any conventional form of time interval recording device which operates in synchronism with the speed of motor 19 and provides an indication at the instant or leading edge of pulse transmission. For example, referring now to Figure 2B, a time interval tape record is shown as obtained from the radiosonde signals illustrated in Figure 2A. It will be seen that a dot is inscribed at the position corresponding with the leading edge of pulses 35 to 41, the width of the pulse being of no importance. In the event that the speed of the recording motor fails to synchronize with the speed of motor 19, this fact will be immediately apparent by observing the position of the reference pulses 35, 37, 38, 40 and 41 in respect to their corresponding time positions on the recording tape. To align the radiosonde motor with recording motor, the recording tape speed is adjusted to correspond with the position taken by the reference signals.

In order to eliminate the need for synchronizing the speeds of recording motor and of switching motor 19 in Figure 1, another embodiment of a chronometric radiosonde system is shown in Figure 3, employing a reference resistor 42 which is insensitive to atmospheric conditions, a ceramic temperature-responsive resistor 43, an electrical hygrometer 44 and a barometric pressure element slide-wire resistor 45. The transmitter is of conventional design comprising a triode 46 in combination with a tank circuit consisting of inductor 47 and variable capacitor 48. The transmitter is keyed by an electromagnetic relay 49 connected in the plate circuit of a triode 50. Filament voltage for both triodes 46 and 50 is provided by "A" battery 51, and plate voltage is furnished by "B" battery 52. In general, the operation of this circuit is similar to that of Figure 1, triode 50 having a capacitor 53 connected between grid and filament, and the dissipation rate of charge on capacitor 53, as governed by the various meteorological elements, controlling the flow of current through triode 50, and in consequence, the operating period of keying relay 49. By switching the reference resistor 42 across condenser 53 once in each cycle, the scale of the reading is determined, thus permitting correction for voltage fluctuations in the apparatus or variations in motor speed.

A rotary selector switch 54 is provided which serves to periodically charge condenser 53 with a voltage obtained from a "C" battery 55 and to dissipate the charge on condenser 53 sequentially through resistance elements 42 to 45. The rotary selector switch 54 comprises a wiper arm 60, rotated by a motor 56 of either spring or electrical construction, in cooperation with a plurality of arcuately shaped fixed contacts disposed along the circular path taken by the wiper arm 60. Each quadrant A to D of the rotary switch 54 contains two small fixed contacts 57 and 58 and a relatively large fixed contact 59, contacts 57 and 58 being disposed at opposite ends of contact 59 and insulated therefrom. All of contacts 57 are tied together and connected to the positive terminal of battery 55 while all of contacts 58 are tied together and connected to the grid of triode 50 as well as the negative terminal of battery 55. Each of contacts 59 in quadrants A to D is connected to one end of elements 42 to 45 respectively. The other ends of elements 42 to 45 are tied together and connected to the grid of triode 50.

The wiper arm 60 is connected to filament of triode 50 so that when imposed over any one of contacts 57, it serves to connect the positive terminal of battery 55 to the filament of triode 50 thereby applying the full potential of battery 55 across condenser 53. When the wiper arm 60 is shifted to any one of contacts 59, the resistance element associated therewith, that is, either element 42, 43, 44 or 45 is shunted across condenser 53. And when the wiper arm of switch 54 makes connection with any one of contacts 58, it effectively shorts the terminals of condenser 53 fully discharging same.

It will be assumed, for purposes of illustration, that rotary switch 54 revolves counter clockwise at a speed of one revolution per 12 seconds. In order to clarify the effect of rotary switch 54 upon radiosonde transmission, reference is had to Figure 4A showing along a time scale graduated from zero to twelve seconds, the interval and duration of each signal transmission.

Transmitter operation during a complete switching cycle will now be discussed beginning with the condition existing when wiper arm 60 is in connection with contact 57 in quadrant A. Since in this position battery 55 is connected across condenser 53 thereby biasing triode 50 to cutoff and releasing the armature of keying relay 49, the transmitter is now inoperative. At a very brief interval thereafter, connection is made between the wiper 60 and contact 59 thereby shunting reference resistor 42 across condenser 53 which proceeds to discharge therethrough at a rate in accordance with R-C combination.

At a point along contact 59 the charge on condenser 53 is reduced to a level where relay 49 is energized, thereby keying the transmitter "on." It will be assumed that this event occurs after two seconds from starting time. When wiper 60 connects with contact 58 the residual charge on condenser 53 is removed, completing the quadrant A operation. Inasmuch as it takes three seconds to traverse the quadrant, pulse 61 in Figure 4A is one second in width.

Entering into quadrant B, wiper 60 connects with contact 58 recharging condenser 53 and again disabling the transmitter. Connection is then made with contact 59, thereby shunting resistor element 43 across condenser 53 causing the transmitter again to be keyed "on" after condenser 53 is sufficiently discharged, which condition will be assumed to occur after one and one-half seconds as shown by pulse 62 in Figure 4A. Continuing into quadrant C, the same effect is repeated with resistor 44 being shunted across condenser 53. It will be assumed in this instance that the transmitter is keyed on after two and a half seconds as shown by pulse 63 in Figure 4A. Finally, in quadrant D element 45 is shunted across charge condenser 53 dissipating the charge thereon at a rate causing the transmitter to be keyed on after one second, as shown by pulse 64 in Figure 4A.

Referring now to Figure 4B, a tape recording is shown of the signals illustrated in Figure 4A. The record in this instance is of the continuous line type, the line being displaced by the reception of signals while the tape is moved at a uniform speed. The width of the pulses appearing on the tape provide the index to the meteorological reading. The reference pulse permits correction of the reading to an extent determined by its departure from a reference width.

For receiving the radiosonde signals transmitted by apparatus disclosed in Figure 1 and Figure 3, a receiver of the type known as super regenerative is preferably employed because of its extreme sensitivity at the ultra high frequencies commonly used in radiosonde applications. Other characteristics of super regenerative circuits making their use desirable for radiosonde reception are their inherent automatic volume control and broad tuning properties so that small deviations from the ground level frequency of the radiosonde transmitter does not prevent reception of the signals. Furthermore, as the frequency of the transmitter continues to drift, it is easily followed by reason of the broad tuning characteristic. For operating the recording stylus the "rush" currents of the super regenerative receiver as controlled by the carrier wave of the transmitter may be made to operate a relay provided with both front and back contacts, the stylus being electrically controlled for operation either on a received radio impulse or on the interruption of an otherwise continuous radio signal. It is to be understood, however, that the particular type of radio receiver and recording device to be used with the radiosonde transmitter of this invention form no part of the invention.

While there has been described what is at present considered a preferred embodiment of the invention, it will be obvious to those skilled in the art that various changes and modifications may be made therein without departing from the invention, and it is, therefore, aimed in the appended claims, to cover all such changes and modifications as fall within the true spirit and scope of the invention.

I claim:

1. The combination in a chronometric radiosonde system comprising a radio frequency transmitter, keying means for said transmitter, a plurality of atmospherically-sensitive resistance elements, a condenser, a source of direct current energy, a rotary switch associated with said energy source, said condenser and said elements in a manner whereby said condenser is periodically charged by said energy and shunted consecutively by each of said elements, means for rotating said switch at a uniform speed, and means for operating said keying circuit for periods whose durations each commence with maximum condenser charge and end when said condenser is discharged by a particular element to a predetermined level.

2. The combination in a chronometric radiosonde system comprising a radio frequency transmitter, keying means for said transmitter, a plurality of atmospherically-sensitive resistance elements, an atmospherically insensitive reference element, a condenser, a source of direct current energy, a rotary switch associated with said energy source, said condenser and said elements in a manner whereby said condenser is periodically charged by said energy and shunted consecutively by each of said elements, means for rotating said switch at a uniform speed, and means for operating said keying circuit for periods whose durations each commence with maximum condenser charge and end when said condenser is discharged by a particular element to a predetermined level.

3. The combination in a chronometric radiosonde system comprising a radio frequency transmitter, keying means for said transmitter, a plurality of atmospherically sensitive resistance elements, a condenser, a source of direct current energy, a rotary switch associated with said energy source, said condenser and said elements in a manner whereby said condenser is periodically charged by said energy and shunted consecutively by each of said elements, means for rotating said switch at a uniform speed, a thermionic amplifier tube having said keying means operatively associated with the output circuit thereof and said condenser in the input circuit thereof whereby when the condenser is at maximum charge said keying means is inoperative, and when said condenser is discharged to a predetermined level said keying means is operative.

JOSEPH A. SIDERMAN.